United States Patent
Goel et al.

(10) Patent No.: US 9,471,358 B2
(45) Date of Patent: Oct. 18, 2016

(54) TEMPLATE PROVISIONING IN VIRTUALIZED ENVIRONMENTS

(71) Applicant: International Business Machines Corporation, Armonk, NY (US)

(72) Inventors: Ramesh K. Goel, Balbir Nagar (IN); Manish Gupta, New Delhi (IN); Rambabu Parvatina, Bangalore (IN); Gopal S. Pingali, Mohegan Lake, NY (US); Rajeev Puri, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 14/033,974

(22) Filed: Sep. 23, 2013

(65) Prior Publication Data

US 2015/0089493 A1   Mar. 26, 2015

(51) Int. Cl.
*G06F 9/455* (2006.01)
*G06F 9/44* (2006.01)
*G06F 11/14* (2006.01)
*G06F 11/20* (2006.01)

(52) U.S. Cl.
CPC ....... *G06F 9/45558* (2013.01); *G06F 11/1484* (2013.01); *G06F 11/2025* (2013.01); *G06F 2009/45562* (2013.01)

(58) Field of Classification Search
None
See application file for complete search history.

(56) References Cited

U.S. PATENT DOCUMENTS

| 8,296,605 | B2 | 10/2012 | John |
| 2009/0222811 | A1 | 9/2009 | Faus et al. |
| 2012/0089972 | A1 | 4/2012 | Scheidel et al. |
| 2012/0131577 | A1* | 5/2012 | Arcese .................... G06F 8/60 718/1 |
| 2012/0272234 | A1 | 10/2012 | Kaiser et al. |
| 2013/0047147 | A1* | 2/2013 | McNeill .............. G06F 9/45533 717/173 |

* cited by examiner

*Primary Examiner* — Van Nguyen
*Assistant Examiner* — Melissa Alfred
(74) *Attorney, Agent, or Firm* — Edward J. Wixted, III (57) ABSTRACT

In a method for provisioning a virtual machine, a processor rates a plurality of software images that include a first software image and a second software image. A processor provisions the virtual machine with the first software image in a first state and the second software image in a second state, wherein the second software image is rated higher than the first software image.

19 Claims, 3 Drawing Sheets

TEMPLATE PROVISIONING IN VIRTUALIZED ENVIRONMENTS

FIELD OF THE INVENTION

The present invention relates generally to the field of virtual machine management, and more particularly to patch management within virtual computing environments.

BACKGROUND OF THE INVENTION

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use software or firmware to achieve fine-grained, dynamic resource sharing. Hypervisors are the primary technology for system virtualization because they provide the greatest level of flexibility in how virtual resources are defined and managed.

When provisioning virtual computing systems, templates are created that contain one or more disks that refer to images. Each template must define one disk that refers to an operating system (OS) image. Additional disks may refer to datablock images. Datablock images store data that can be accessed and modified by one or more virtual computing systems. In virtual computing systems, and computing systems in general, operating systems are periodically patched to protect against security threats, bugs, or other stability issues. Other software may be patched or deploy a new version to protect against security threats, bugs, or other stability issues.

Hypervisors provide the ability to divide physical computing system resources into isolated logical partitions. Each logical partition operates like an independent computing system running its own operating system (e.g., a virtual system). Operating systems running in a virtualized environment are often referred to as "guest machines." Exemplary operating systems include AIX®, IBM® i, Linux®, and the virtual I/O server (VIOS). Hypervisors can allocate dedicated processors, I/O adapters, and memory to each logical partition and can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments.

The hypervisor can also dynamically allocate and de-allocate dedicated or shared resources (such as processors, I/O, and memory) across logical partitions while the partitions are actively in use. This is known as dynamic logical partitioning or dynamic LPAR and allows the hypervisor to dynamically redefine all available system resources to reach optimum capacity for each partition.

In addition to creating and managing the logical partitions, the hypervisor manages communication between the logical partitions via a virtual switch. To facilitate communication, each logical partition may have a virtual adaptor for communication between the logical partitions, via the virtual switch. The type of the virtual adapter depends on the operating system used by the logical partition. Examples of virtual adapters include virtual Ethernet adapters, virtual Fibre Channel adapters, virtual Small Computer Serial Interface (SCSI) adapters, and virtual serial adapters.

Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS. The VIOS can provide virtualized network resources to the other logical partitions via a shared Ethernet adapter (SEA). The SEA bridges a physical Ethernet adapter with the respective virtual adapters and may apportion network bandwidth.

SUMMARY

Aspects of an embodiment of the present invention disclose a method, computer program product, and computing system for provisioning a virtual machine. A processor rates a plurality of software images that include a first software image and a second software image. A processor provisions the virtual machine with the first software image in a first state and the second software image in a second state, wherein the second software image is rated higher than the first software image.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
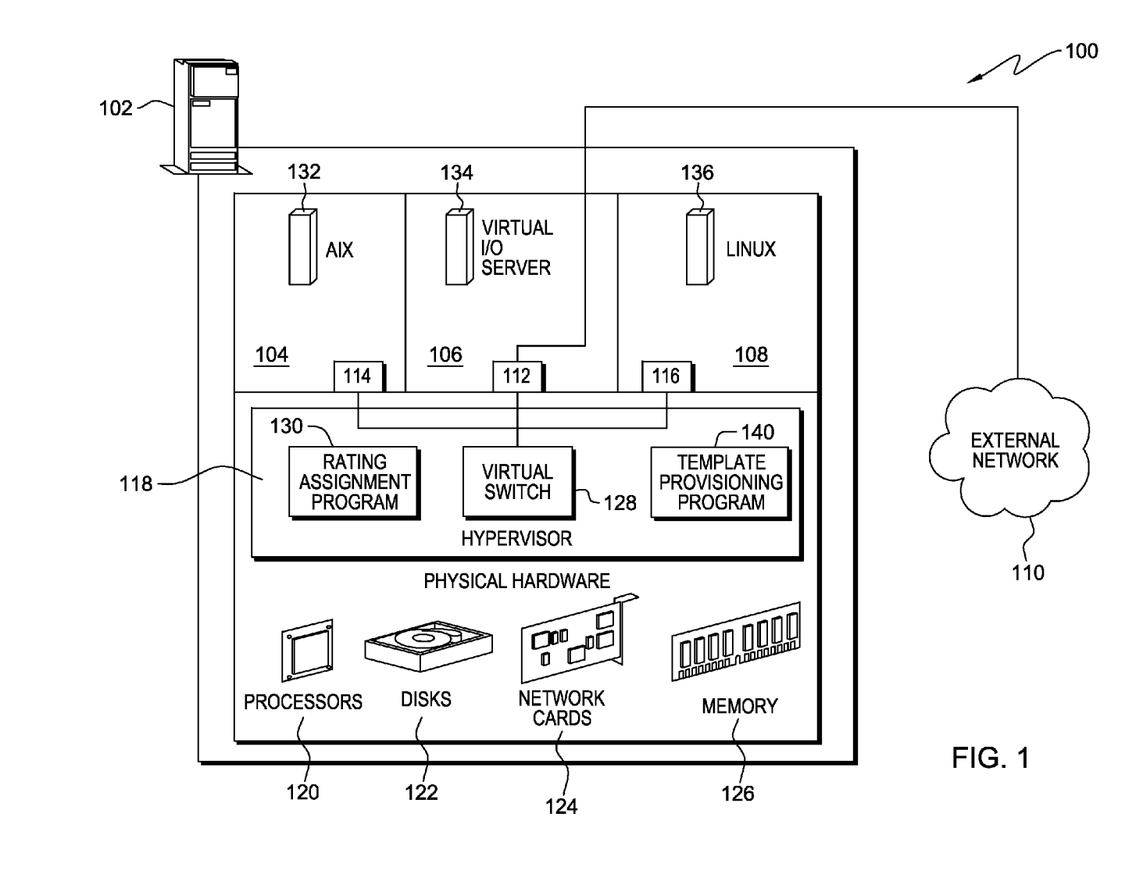
FIG. 1 illustrates a virtualized computer environment, in accordance with an embodiment of the present invention.

FIG. 1 illustrates a virtualized computer environment 100 for creating and rating image templates that are used for provisioning individual virtual machine (VM) environments, in accordance with an embodiment of the present invention. Virtualized computer environment 100 includes computer 102. Computer 102 is divided into multiple logical partitions that include logical partitions 104, 106, and 108. In the illustrated example, logical partitions 104, 106, and 108 each run an independent operating environment, such as an operating system (OS). Logical partition 104 runs OS 132, which can be AIX®, logical partition 106 runs OS 134, which can be a virtual I/O server (VIOS), and logical partition 108 runs OS 136, which can be Linux®. Other operating environments and combinations of operating environments may be included in logical partitions 104, 106, and 108. In various embodiments of the present invention, any number of partitions may be created and may exist on separate physical computers of a clustered computer system.

Communications from external network 110 are routed through Shared Ethernet adapter (SEA) 112 on VIOS partition 106 to virtual adapters 114 and 116 on respective logical partitions 104 and 108, in accordance with an embodiment of the present invention. Communications from virtual adapters 114 and 116 on respective logical partitions 104 and 108 may be routed through SEA 112 on VIOS partition 106 to external network 110. In an alternative embodiment, physical network adapters are allocated to logical partitions 104, 106, and 108.

Hypervisor 118 forms logical partitions 104, 106, and 108 from the physical resources of computer 102 through logical sharing of designated processors 120, storage disks 122, network cards 124, and/or memory 126 among local partitions 104, 106, and 108. Hypervisor 118 performs standard operating system functions and manages communication between logical partitions 104, 106, and 108 via virtual switch 128. Virtual switch 128 is a software program that allows one virtual machine to communicate with another. Virtual switch 128 may be embedded into virtualization software or may be included in a server's hardware as part of its firmware. Hypervisor 118 also includes rating assignment program 130 and template provisioning program 140. Template provisioning program 140 is software that provisions new virtual machines with two image templates, wherein the first image template can be in an active state and the second image template can be in a passive state, based upon patch level and stability factors. In one embodiment, template provisioning program 140 provisions new virtual machines with two OS image templates, a first active OS image template and a second passive OS image template. In another embodiment, the first and second image templates contain other software, applications, and/or middleware. One of skill in the art will appreciate that in other embodiments, rating assignment program 130 and template provisioning program 140 may be located on a storage management module connected to hypervisor 118, or alternatively, may run on a separate computer from computer 102 within virtualized computer environment 100.

Rating assignment program 130 operates to receive patches, create updated versions of image templates, and assign a rating to each image template. In one embodiment, rating assignment program specifically receives OS patches, creates updated versions of OS image templates, and assigns a rating to each OS image template. Rating assignment program 130 can store image templates to one or more storage disks 122 of computer 102. Exemplary embodiments of rating assignment program 130 will assign ratings based on stability, version number, and patch level. Multiple image template versions, along with ratings and other information, may be accessible to administrators or users through a catalog. The catalog may be an accessible location from which users or administrators can view multiple image templates, either OS, middleware, or other software image templates, and view ratings and information about the selected image templates. Information about the selected image templates may include the date of release, file size, rating, review(s), or other information. The catalog may allow for manual selection of an image template for use in provisioning a new virtual machine (VM). In one embodiment, rating assignment program 130 operates within hypervisor 118. In another embodiment, rating assignment program 130 is a separate program that can operate outside of hypervisor 118.

Template provisioning program 140 operates to automatically select and manage image templates when provisioning a virtual machine. In one embodiment, template provisioning program operates to automatically select and manage OS image templates when provisioning a virtual machine. Template provisioning program 140 may select two image templates. Template provisioning program 140 may designate one image template as an active image template, and the other image template as a passive image template. Template provisioning program 140 may access image templates from one or more storage disks 122. In one embodiment, template provisioning program 140 will designate the image template that includes the patched operating system, middleware, or software in its most up-to-date and recently patched version as an active image template, while template provisioning program 140 will designate the version of the image template that has the highest rating (i.e., is known to be the most stable), or is highly rated, as a passive image template. In another embodiment, template provisioning program 140 will designate a first image template as an active image template, and a second image template, one which has a higher rating than the first image template, as a passive image template. If the first image template and the second image template have the same rating, template provisioning program 140 may designate one image template as having a higher rating based on other factors. For example, template provisioning program 140 may designate a higher rating for two equally rated image templates according to any of the following factors: date of creation, reported problems, reported issues, or test data. In one embodiment, if the active image template fails, template provisioning program 140 will cause the virtual machine to failover to the passive image template. By failing over to the passive image template, template provisioning program 140 will cause the passive image template to enter an active state. When such a failover occurs, template provisioning program 140 may cause the originally active image template to enter a passive state, or the template provisioning program may cause the originally active image template to be deleted. In an exemplary embodiment, template provisioning program 140 may cause the passive image template to be deleted if the active image does not fail, malfunction, or otherwise produce problems within a predetermined time period. In one embodiment, template provisioning program operates within hypervisor 118. In another embodiment, template provisioning program 140 is a separate program that can operate outside of hypervisor 118.

Figure 2:
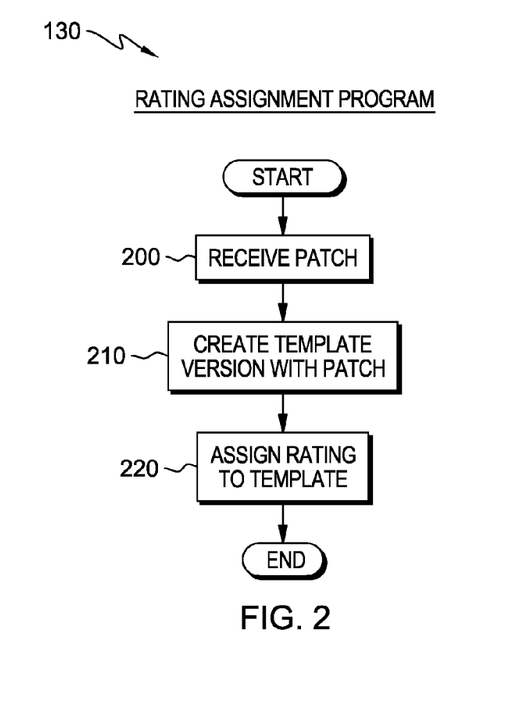
FIG. 2 depicts a flowchart of the steps of a rating assignment program, in accordance with an embodiment of the present invention.

FIG. 2 depicts a flowchart of the steps of rating assignment program 130 executing within virtualized computer environment 100 of FIG. 1, for creating and assigning a rating to an image template after receiving one or more patches, in accordance with one embodiment of the present invention. In one embodiment, rating assignment program may assign ratings to OS image templates. In another embodiment, rating assignment program may assign ratings to image templates containing middleware, software, or other applications. In one embodiment, image templates may be manually selected by an administrator or other user to provision logical partitions such as 104, 106, 108, or other logical partitions not shown. In another embodiment, image templates may be automatically selected using ratings assigned by rating assignment program 130.

In an embodiment, initially, one or more image templates are stored. In another embodiment, image templates are stored to the one or more storage disks 122. A set of one or more image templates may correspond to a set of software. Alternatively, a set of one or more OS image templates may correspond to a particular operating system. In certain embodiments, there may be multiple sets of one or more OS image templates that correspond to different operating systems.

In step 200, rating assignment program 130 receives a patch for software, such as an operating system or application. Rating assignment program 130 may receive a patch from a patch download website, an automatic check for updates, through user installation, or by another patch or updated version retrieval method. Alternatively, rating assignment program 130 may retrieve patches as a part of general computer maintenance procedures, such as scheduled events.

When rating assignment program 130 receives a patch (step 200), rating assignment program 130 will create a new image template version. After creating a new image template version, rating assignment program 130 may retain any or all prior image template versions (step 210) that have been stored to one or more storage disks 122. In one embodiment, rating assignment program 130 may create a new image template version by bringing a VM online using a previously stored image template within a test environment, installing the received patch(es), and creating a new image template once the installation is complete. In other embodiments, rating assignment program 130 will roll back patches and delete created templates if the image template fails to install while operating within the test environment. Each newly created image template version may be one or more patch levels ahead of any previously created image template versions.

Each time rating assignment program 130 creates a new image template version, the rating assignment program will assign a new rating to each of the stored image template versions (step 220). Rating assignment program 130 may assign ratings by analyzing factors such as patch level, template stability, actual incident/problem report data from provisioned VMs, test data, business importance of the application(s) running on the VM, and by using other information. For example, rating assignment program 130 may utilize the application of test-suites that are applied to the software, OS, or middleware to analyze the robustness of the template, and use the results to define the rating. In some embodiments, rating assignment program 130 will update the rating as more monitoring information becomes available. For example, once templates have been used to provision new VMs, rating assignment program 130 may use information obtained from each provisioned VM to adjust the rating of the particular template used. For example, if the frequency of incidents from a particular template are higher than predicted based on the information from a test-suite, rating assignment program 130 may reduce the rating for that particular template.

Assigned ratings may vary based upon the type of image template. For example, a rating scale for an image template containing application software, such as word processing programs, spreadsheets, and other types of programs may vary from the rating scale for an OS image template. Additionally, rating scales may vary when the application software is different between templates, such as when a first image template contains a word processing program and a second image template contains computer-aided design (CAD) software.

The rating assigned to each image template version is used to measure the risk associated with creating a VM from that version of the image template, in accordance with an embodiment of the present invention. An image template version with a higher rating is less likely to have problems than an image template version with a lower rating. Provisioning a VM using an image template with a lower rating and thus a higher risk increases the threat of incompatibility, errors, lack of security and other issues arising. In one embodiment, rating assignment program 130 determines the rating by utilizing Formula [1] as follows:

$$\text{Rating} = (1 - r_{patch}) \times (1 - r_{incidents}) \qquad [1]$$

In Formula [1], the rating is a number between 0 and 1, with 1 being the highest rating (i.e., the most stable), $r_{patch}$ stands for the risk of running a VM from an image template with the current patch level, as compared to the latest available patch, $r_{incidents}$ is the risk associated with provisioning a VM from the current image template version, based upon actual or simulated incident rates, and $r_{patch}$ is a monotonic function with the range (0,1). In an embodiment, $r_{patch}$ may be determined using Formula [2] as follows:

$$r_{patch} = (\text{patch}_{new} - \text{patch}_{current}) / (\text{patch}_{new} - \text{patch}_{low}) \qquad [2]$$

In Formula [2], $\text{patch}_{new}$ is the patch level for the latest patch, or an integer corresponding to the newest available patch, $\text{patch}_{current}$ is an integer corresponding to the patch that is currently being rated, and $\text{patch}_{low}$ is an integer corresponding to the oldest or lowest level patch. In Formula [2], $r_{patch}$ will be small when the current patch level ($\text{patch}_{current}$) is close to the most recently available patch level ($\text{patch}_{new}$), and will be large when the patch level is older. In other words, the further behind an image template is from the most recent patched version, the higher $r_{patch}$ will be. $r_{patch}$ takes into account the risk of provisioning a virtual machine with an out-of-date patch level. Generally, patch levels will be given numerical values. In an embodiment, patch level numerical values may be granted based upon the importance of the patch or the severity of changes caused by the patch. Minor patches may increase the numerical value by a smaller sum when compared to a major or important patch. In another embodiment, patches may be given numerical values in a sequential order based on patch release date, regardless of the level of importance of each patch.

As previously discussed, $r_{incidents}$ is the risk associated with provisioning a VM from the current image template version, based upon incidents and/or incident frequency. If enough data is available, actual incident data will be used, however, if there is no actual incident data, or the amount of actual incident data is lacking, simulations and tests may be run to estimate the robustness of the current image template. In one embodiment, $r_{incidents}$ may be determined by Formula [3] as follows:

$$r_{incidents} = \frac{x_i}{x_{max}} * \left(1 - \frac{n_i}{\sum_j \frac{x_j}{x_{max}} * n_j}\right) \qquad [3]$$

In Formula (3), $x_i$ is the number of incidents seen for the current image template version, while $x_{max}$ is the maximum number of incidents seen for all of the template versions in the catalog. $n_i$ is the number of VMs running the current template version. The subscript j refers to each available version of the template. Formula (3) adjusts the risk of incidents based upon the total number of incidents seen from the current template version, the total number of incidents seen from all versions of the template, and the total number of VMs running the current template. Formula (3) assigns a risk based on the frequency of incidents, while also taking into account the volume of VMs deployed that run the current template. For example, if two template versions have had the same number of incidents, but they have been issued along with a different number of VMs, the version that is present in the higher number of VMs should have the higher rating. For example, $x_j$ is the number of incidents seen for each image template version individually. The summation in Formula (3) will be accomplished by adding the results of the containing equation as applied to each available template version.

While the present embodiment depicts an exemplary set of formulas for determining ratings, one skilled in the art would recognize that additional factors or different rating methods may be used to accomplish the tasks of the present invention.

In some embodiments, all created and stored image template versions may be organized within a user-accessible catalog. In other embodiments, the catalog may offer users a list of image templates ranked according to a rating assigned by rating assignment program 130, such as the rating previously discussed. The catalog may be organized according to the contents of the image template. For example, OS image templates may be grouped separately from image templates containing middleware or other applications. Image templates may also be organized according to the software they contain so that a user can input desired software applications and search for applicable image templates that meet their needs. Users may search through the catalog and select the image template that they desire to use to provision one or more VMs. In one embodiment, the catalog is hosted and accessible to users via cloud computing techniques. In an exemplary embodiment, users may be able to estimate costs due to a VM failure that occurs as a result of operating with the selected image template by comparing the assigned rating of an image template to estimated lost profits and increased costs that might result if the VM were to fail. In another embodiment, when provisioning a VM, template provisioning program 140 may automatically select the image template based on previously input requirements and preferences. In yet another embodiment, the catalog may consist of middleware within the image templates. Such image templates may be patched at any level of the software stack—OS or the middleware.

Whenever a patch at any of the layers is applied a new template version is created. The template versions corresponding to middleware patches can also be shown in the catalog with their respective ratings and a user can choose the image template version which best suits the risk profile of that user.

Figure 3:
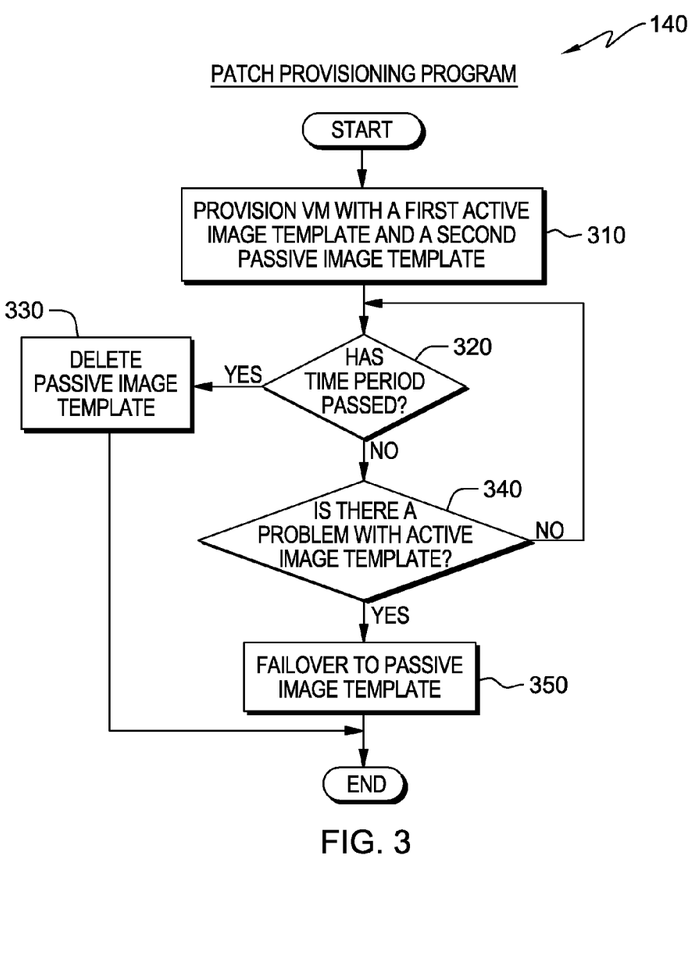
FIG. 3 depicts a flowchart of the steps of a patch provisioning program, in accordance with an embodiment of the present invention.

FIG. 3 depicts a flowchart of the steps of template provisioning program 140 executing within the virtual environment of FIG. 1, for automatically selecting and managing an active image template and a passive image template when provisioning a VM, in accordance with one embodiment of the present invention. In one embodiment, patch provisioning program 140 automatically selects and manages active and passive OS image templates when provisioning a VM.

In one embodiment, initially, an administrative user at computer 102 may act to request that patch provisioning program 140 provisions a VM, such as logical partition 104, using an image template automatically selected by the patch provisioning program.

In step 310, patch provisioning program 140 causes a VM, such as logical partition 104, to be provisioned with both a first image template (i.e., active image template) and a second image template (i.e., passive image template). In one embodiment patch provisioning program 140 causes a hypervisor, such as hypervisor 118, to provision the VM. In another embodiment, patch provisioning program 140 operates within hypervisor 118 and provisions the VM. Generally, the first image template will be provisioned as the active image template for the VM, while the second image template will be placed in a passive state. In one embodiment, the active image template is the image template that is most up-to-date, as created by rating assignment program 130, at the time of provisioning the VM. The passive image template may be the image template with the highest, or a high rating, as assigned by rating assignment program 130, at the time of provisioning the VM. In another embodiment, the passive image template may be an image template with a rating equal to or higher than the active image template. The passive image template will contain the same OS, middleware, and/or set of applications as the active image template, but the passive image template may be a different version, i.e., a version that is patched to a different level. Typically, the passive image template will be an older version of the active image template, and a version that has previously been stable according to the information obtained by rating assignment program 130. In some embodiments, the passive image template may have a higher rating than the active image template due to a lack of actual data for the active image template. Initially, the passive image template will not be used by the provisioned VM. Rather, the passive image template will be kept in a passive state for a period of time, as previously specified, to act as a failsafe in the event that the active image template fails, has problems, or is otherwise incompatible with the environment or applications. In addition to the active and passive image templates, the VM may be provisioned with a boot disk, and one or more additional data disks containing installed software and any user data. The data disk may be a virtual hard drive and it may be located on one or more storage disks 122.

In decision 320, patch provisioning program 140 determines whether a specified time period has passed since the VM was initially provisioned. In one embodiment, the specified time period may be a function of statistics seen in the past for other newly provisioned VMs. For example, the specified time period may be the time period within which previous versions of the currently active image template have failed, when previous failures were documented. The specified time period may be any predetermined time period and may be customizable by an administrative or other user of the VM. In general, the specified time period may be the period of time within which the admin, user, or other entity believes that having a second image template as an available failsafe is beneficial to the smooth operation of the provisioned VM.

If patch provisioning program 140 determines that the specified time period since the VM was initially provisioned has passed (decision 320, yes branch), the patch provisioning program will cause the passive image template to be deleted or otherwise removed from its connection to the provisioned VM (step 330). In one embodiment, patch provisioning program 140 will cause a hypervisor, such as hypervisor 118, to delete or otherwise remove the passive image template. After patch provisioning program 140 deletes the passive image template, the program is complete and the provisioned VM will continue to operate using the active image template.

If patch provisioning program 140 determines that the specified time period since the VM was initially provisioned has not passed (decision 320, no branch), the patch provisioning program will determine whether or not there is a problem with the active image template (decision 340). Patch provisioning program 140 may determine whether a problem exists with the active image template by monitoring error reports, detecting environment failure, or by receiving an indication from an administrator or user of the provisioned VM. In one embodiment, there may be a threshold indicating the number of, or extent of problems that should be encountered before failing over to the passive image template. In such an embodiment, if the threshold has not been reached, the active image template will remain active despite encountering a problem or error.

If patch provisioning program 140 determines that there is no problem with the active image template (decision 340, no branch), the patch provisioning program will determine whether the specified period of time has passed (decision 320) in the manner previously discussed.

If patch provisioning program 140 determines that there is a problem with the active image template (decision 340, yes branch), the patch provisioning program will cause the provisioned VM to failover to the passive image template (step 350). In one embodiment, patch provisioning program 140 causes a hypervisor, such as hypervisor 118, to failover the VM to the passive image template. If the failed image template is an OS image template, failing over to the passive OS image template may involve restarting the VM using a boot disk that looks to the passive OS image template. Because the applications and data may be stored on a separate data disk, failing over to the passive OS image template should allow the VM to have similar access to the applications and software stored on the data disk, despite operating using an OS image template of a different version (i.e., different patch level). Similarly, if the failed image template is an image template containing software applications, if there is a separate data disk containing saved application files, failing over to the passive image template may have a negligible impact upon loss of data. In one embodiment, patch provisioning program 140 may delete the originally active image template, i.e., the image template that was deactivated in favor of the passive image template. In another embodiment, patch provisioning program 140 may replace the originally active image template with an image template of a different version to act in either a passive or active capacity.

Figure 4:
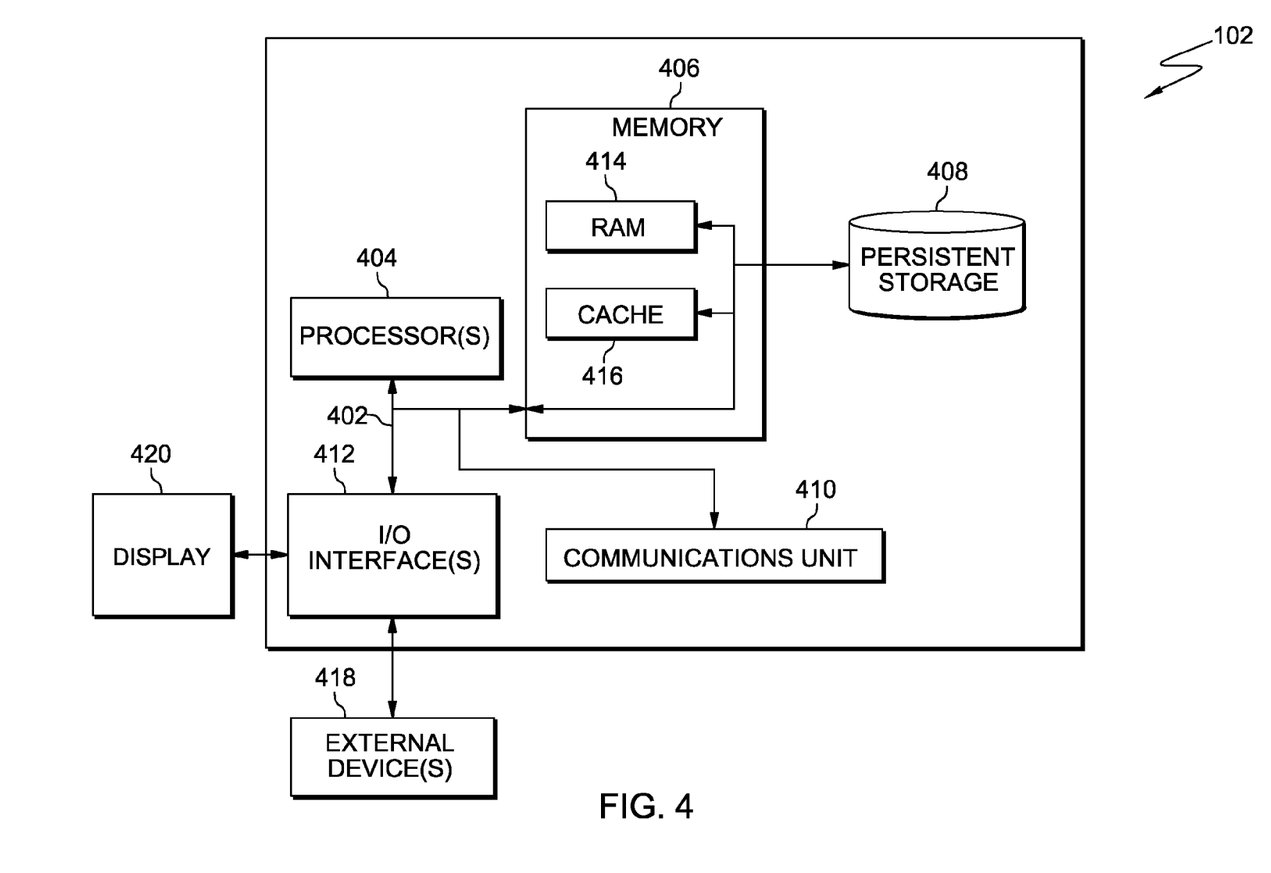
FIG. 4 depicts a block diagram of components of a computer, in accordance with an embodiment of the present invention.

FIG. 4 depicts a block diagram of components of computer 102 in accordance with an illustrative embodiment. It should be appreciated that FIG. 4 provides only an illustration of one implementation and does not imply any limitations with regard to the environment in which different embodiments may be implemented. Many modifications to the depicted environment may be made.

Computer 102 is representative of any electronic device capable of executing machine-readable program instructions and hosting a virtualized computer environment. Computer 102 includes communications fabric 402, which provides communications between computer processor(s) 404, memory 406, persistent storage 408, communications unit 410, and input/output (I/O) interface(s) 412. Processor(s) 404 include, at least in part, designated processors 120 in FIG. 1 to be shared among logical partitions.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. Memory 406 includes, at least in part, designated memory 126 depicted in FIG. 1 to be shared among logical partitions.

Hypervisor 118, with virtual switch 128, rating assignment program 130, and template provisioning program 140, are stored in persistent storage 408 for execution by one or more of the respective computer processors 404 via one or more memories of memory 406. Persistent storage 408 includes, at least in part, designated storage disks 122 depicted in FIG. 1 to be shared by logical partitions. In the embodiment illustrated in FIG. 4, persistent storage 408 includes flash memory. Alternatively, or in addition to flash memory, persistent storage 408 may include a magnetic disk storage device of an internal hard drive, a solid state, a semiconductor storage device, read-only memory (ROM), erasable programmable read-only memory (EPROM), or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. In another embodiment still, computer 102 may be devoid of communications unit 410. Hypervisor 118, rating assignment program 130, and template provisioning program 140 may be downloaded to persistent storage 408 through communications unit 410. Communications unit 410 includes, at least in part, designated network cards 124 depicted in FIG. 1 to be shared by the logical partitions.

I/O interface(s) 412 allows for input and output of data with other devices that may be connected to computer 102. For example, I/O interface 412 may provide a connection to external devices 418 such as a keyboard, keypad, a touch screen, and/or some other suitable input device. In a preferred embodiment, I/O interfaces are also shared among logical partitions. External devices 418 can also include portable computer-readable storage media such as, for example, thumb drives, portable optical or magnetic disks, and memory cards. Software and data used to practice embodiments of the present invention, e.g., hypervisor 118, with virtual switch 128, rating assignment program 130, and template provisioning program 140, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for provisioning a virtual machine, the method comprising:
    automatically rating, by one or more processors, a plurality of software images that include a first software image and a second software image, wherein:
        the plurality of software images are rated based, at least in part, on date of creation, patch level, and type of software included in each image; and
        the second software image is rated higher than the first software image;
    automatically selecting, by one or more processors, the first software image and the second software image based on the rating, wherein the second software image comprises a less recently patched version of software included in the first software image;
    determining, by one or more processors, to place the first software image in an active state and the second software image in a passive state based on the rating; and
    automatically provisioning, by one or more processors, the virtual machine with the first software image in the active state and the second software image in the passive state.

2. The method of claim 1, wherein the plurality of software images are operating system (OS) images.

3. The method of claim 1, further comprising:
    causing the second software image to enter the active state if the first software image malfunctions.

4. The method of claim 1, further comprising:
deleting the second software image if a predetermined period of time has passed and the first software image remains operational.

5. The method of claim 1, wherein the step of automatically rating, by one or more processors, the plurality of software images includes:
analyzing factors selected from the group consisting of number of patch levels below a specified patch level, reported problems, reported issues, and test data.

6. The method of claim 1, wherein the first software image is selected from a catalog, and wherein the catalog organizes the plurality of software images by the rating of each software image in the plurality of software images.

7. A computer program product for provisioning a virtual machine, the computer program product comprising:
one or more computer-readable storage media, wherein the one or more computer-readable storage media are not transitory signals per se, and program instructions stored on the one or more computer-readable storage media, the program instructions comprising:
program instructions to automatically rate a plurality of software images that include a first software image and a second software image, wherein:
the plurality of software images are rated based, at least in part, on date of creation, patch level, and type of software included in each image; and
the second software image is rated higher than the first software image;
program instructions to automatically select the first software image and the second software image based on the rating, wherein the second software image comprises a less recently patched version of software included in the first software image;
program instructions to determine to place the first software image in an active state and the second software image in a passive state based on the rating; and
program instructions to automatically provision the virtual machine with the first software image in the active state and the second software image in the passive state.

8. The computer program product of claim 7, wherein the plurality of software images are operating system (OS) images.

9. The computer program product of claim 7, further comprising:
program instructions, stored on the one or more computer-readable storage media, to cause the second software image to enter the active state if the first software image malfunctions.

10. The computer program product of claim 7, further comprising:
program instructions, stored on the one or more computer-readable storage media, to delete the second software image if a predetermined period of time has passed and the first software image remains operational.

11. The computer program product of claim 7, wherein program instructions to automatically rate the plurality of software images include:
program instructions to analyze factors selected from the group consisting of image stability, number of patch levels below a specified patch level, reported problems, reported issues, and test data.

12. The computer program product of claim 7, wherein the first software image is selected from a catalog, and wherein the catalog organizes the plurality of software images by the rating of each software image in the plurality of software images.

13. A computer system for provisioning a virtual machine, the computer system comprising:
one or more computer processors, one or more computer-readable storage media, and program instructions stored on the computer-readable storage media for execution by at least one of the one or more processors, the program instructions comprising:
program instructions to automatically rate a plurality of software images that include a first software image and a second software image, wherein:
the plurality of software images are rated based, at least in part, on date of creation, patch level, and type of software included in each image; and
the second software image is rated higher than the first software image;
program instructions to automatically select the first software image and the second software image based on the rating, wherein the second software image comprises a less recently patched version of software included in the first software image;
program instructions to determine to place the first software image in an active state and the second software image in a passive state based on the rating; and
program instructions to automatically provision the virtual machine with the first software image in the active state and the second software image in the passive state.

14. The computer system of claim 13, wherein the plurality of software images are operating system (OS) images.

15. The computer system of claim 13, further comprising:
program instructions, stored on the one or more computer-readable storage media for execution by at least one of the one or more processors, to cause the second software image to enter the active state if the first software image malfunctions.

16. The computer system of claim 13, further comprising:
program instructions, stored on the one or more computer-readable storage media for execution by at least one of the one or more processors, to delete the second software image if a predetermined period of time has passed and the first software image remains operational.

17. The computer system of claim 13, wherein program instructions to automatically rate the plurality of software images includes:
program instructions to analyze factors selected from the group consisting of image stability, number of patch levels below a specified patch level, reported problems, reported issues, and test data.

18. The method of claim 1, wherein the step of automatically rating, by the one or more processors, the plurality of software images includes analyzing image stability.

19. The method of claim 1, further comprising:
selecting, by one or more processors, the first software image based on the first software image being a most up-to-date version of the software; and
selecting, by one or more processors, the second software image based on the rating.

* * * * *